Sept. 29, 1936.   H. FRASER   2,055,971
OVERHEAD TRACKS FOR CARS, AIRCRAFT AND THE LIKE
Filed July 5, 1934   5 Sheets-Sheet 3

H. Fraser
INVENTOR

Marks & Clerk

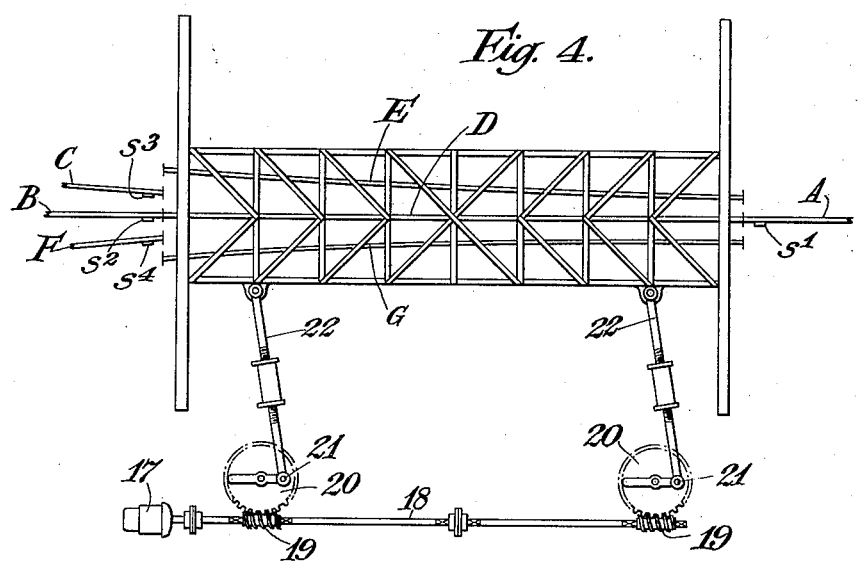
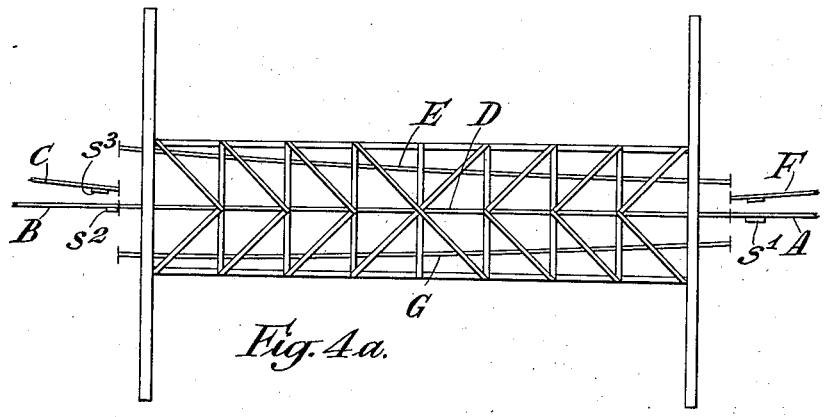
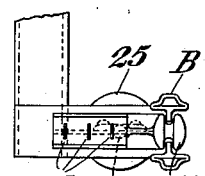
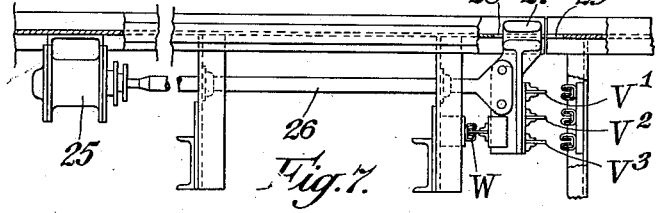

Sept. 29, 1936. H. FRASER 2,055,971
OVERHEAD TRACKS FOR CARS, AIRCRAFT AND THE LIKE
Filed July 5, 1934 5 Sheets-Sheet 5

H. Fraser
INVENTOR
By: Marks & Clark
Attys.

Patented Sept. 29, 1936

2,055,971

UNITED STATES PATENT OFFICE 2,055,971

OVERHEAD TRACKS FOR CARS, AIRCRAFT, AND THE LIKE

Hugh Fraser, Burnside, Rutherglen, Scotland, assignor to Inter-Counties Limited, Glasgow, Scotland Application July 5, 1934, Serial No. 733,886
In Great Britain March 8, 1934

4 Claims. (Cl. 104—124)

This invention relates to overhead tracks or railways for cars, aircraft and the like, suspended therefrom.

The invention is particularly, but not exclusively, applicable to a system of overhead transport as set forth in United States specification No. 1,459,495 in which a car is suspended from an overhead rigid track and is guided by a rigid track below the car.

One object of the invention is to provide suitable means for interlocking the switching means with fixed tracks and sidings.

A further object of the invention is to devise suitable means whereby the switching means cannot be operated when it is locked to the fixed tracks.

The tracks may be single or double, that is, they may have a single line or two lines, one for the traffic in one direction and the other for the traffic in the other direction.

One form of the invention will now be described, by way of example, with reference to the accompanying drawings in which:—

Figure 4 shows diagrammatically a plan of the traversing mechanism.

Figure 4a is an alternative arrangement of Figure 4.

Figure 5 is an elevation of the locking gear.

Figure 6 is an end view of locking gear at the gap.

Figure 7 is a plan of Figure 5.

Figure 9:
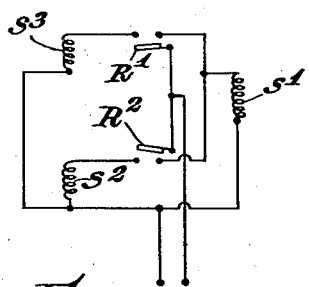
Figure 10A:
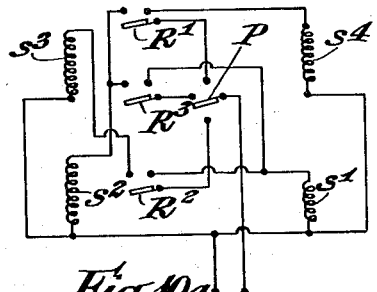
Figure 10:
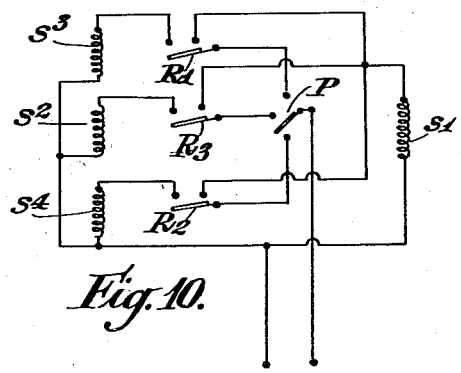

Figures 9, 10, and 10a are diagrammatic representations of the electrical connections.

Figure 10a is a diagrammatic representation of the electrical connections for use in the alternative arrangement shown in Figure 4a.

According to a preferred embodiment of this invention as illustrated the track comprises a main overhead track A and lower track $a$ and branch overhead tracks B, C, and lower tracks, $b, c$, converging into said main track. Said tracks are fixed, except those forming the junction which are carried by a movable structure arranged to be traversed in a gap formed at the junction.

The fixed tracks may be supported by a fixed structure such as is set forth in the said prior patent specification and the gap in the structure maintained in shape and size by means of box latticed spacing girders 1, 1, above the level of main girders and 2, 2, below the level of sway frame girders together with cross bracing 3, 3. Turnbuckles, not shown, are incorporated in this cross bracing for adjustment.

Within the gap columns 4, 4, and girders 5, 5, or other suitable supporting means are provided which support transverse rails 6, 6, on which bogies carrying a movable structure can be traversed.

The traversable structure comprises a framework erected on two transverse girders 8, 8, mounted on four bogies, 9, 9, built into the ends of the girders. Said girders are rigidly connected to each other by sway-frame girders 10, which carry the lower movable tracks $d, e$. The upper tracks D, E, from which the cars are suspended are suspended from an overhead girder 11 supported by upright trestles 12 carried by the transverse girders. The trestles are rigidly braced by tie-rods 13 so that the structure will retain its shape, the overhead girder acting as a strut. Turnbuckles, not shown are incorporated in the tie-rods so that fine adjustment of the structure can be made.

The track D is straight and connects the track A with the track B but the track E is curved and connects the track A with the track C. If desired, another branch track F, shown in alternative positions in Figures 4 and 4a, may be provided, and another curved track G, mounted upon a movable framework to connect the track F with the track A in one case, and the track F with the track B in the other case. Both the fixed and movable framework are suitably widened to accommodate the three tracks.

The tracks carried by the movable structure may be curved or straight to suit the tracks which they have to complete, but they must be inclined to each other so that they can be brought in to register with the ends of the tracks which it is desired to connect together. Generally one track as A, D, B will be straight so that cars may pass at speed through the junction while one or two other tracks such as C and F are inclined thereto.

The wheels 14 of the bogies are not flanged and to ensure that the movable structure will be guided accurately guide wheels 15 are provided. In preference three wheels are attached to the stationary structure, at each side, two at the level of the sway frame girders, and one at the level of the overhead girders. Said wheels are mounted to rotate in a horizontal plane and their treads are arranged to engage with rails 16, which may be in the form of rolled sections, attached to the sides of the movable structure.

The means for traversing the movable structure conveniently comprises an electric motor 17 (Fig. 4) direct coupled to a shaft 18 carrying two worms, 19, 19, which engage with worm-wheels, 20, 20, to which are attached adjustable cranks 21, 21. The motor, shaft and worm-wheels are secured to a spacing girder immediately below the level of the sway frame girders. The crank-pins are connected to the movable structure by two connecting rods 22, 22, which are adjustable as to length by a turnbuckle arrangement. The arrangement is such that the two dead-centre positions of the cranks attached to the worm-wheels correspond to the two running positions of the movable structure. The reason for choosing the dead-centre positions is that one or two revolutions more-or-less of the motor when the cranks are in these positions, will have practically no effect on the position of the movable structure. If three branch tracks are employed two will be at the dead centres and the other at the intermediate position.

It is necessary to lock the movable framework in position when completing the main and branch tracks. In order to effect this a compressed air cylinder 25 (Figs. 5, 6 and 7) is mounted upon each of the fixed rail girders, A, B, C, and is provided with a piston rod 26 to which is attached a locking member 27 adapted to slide in a slot 28 in the girder. Corresponding slots 29 are provided in the movable rail girders at each end thereof. The locking member is adapted to engage both sides of the webs of the track girders and prevent a relative vertical and horizontal displacement. Also attached to the locking member are three switches V, and a switch W. The switches V are for signaling purposes, but the switch W is connected in the circuit of the traversing motor 17 so that it cannot be started up when the rails are locked.

Figure 1:
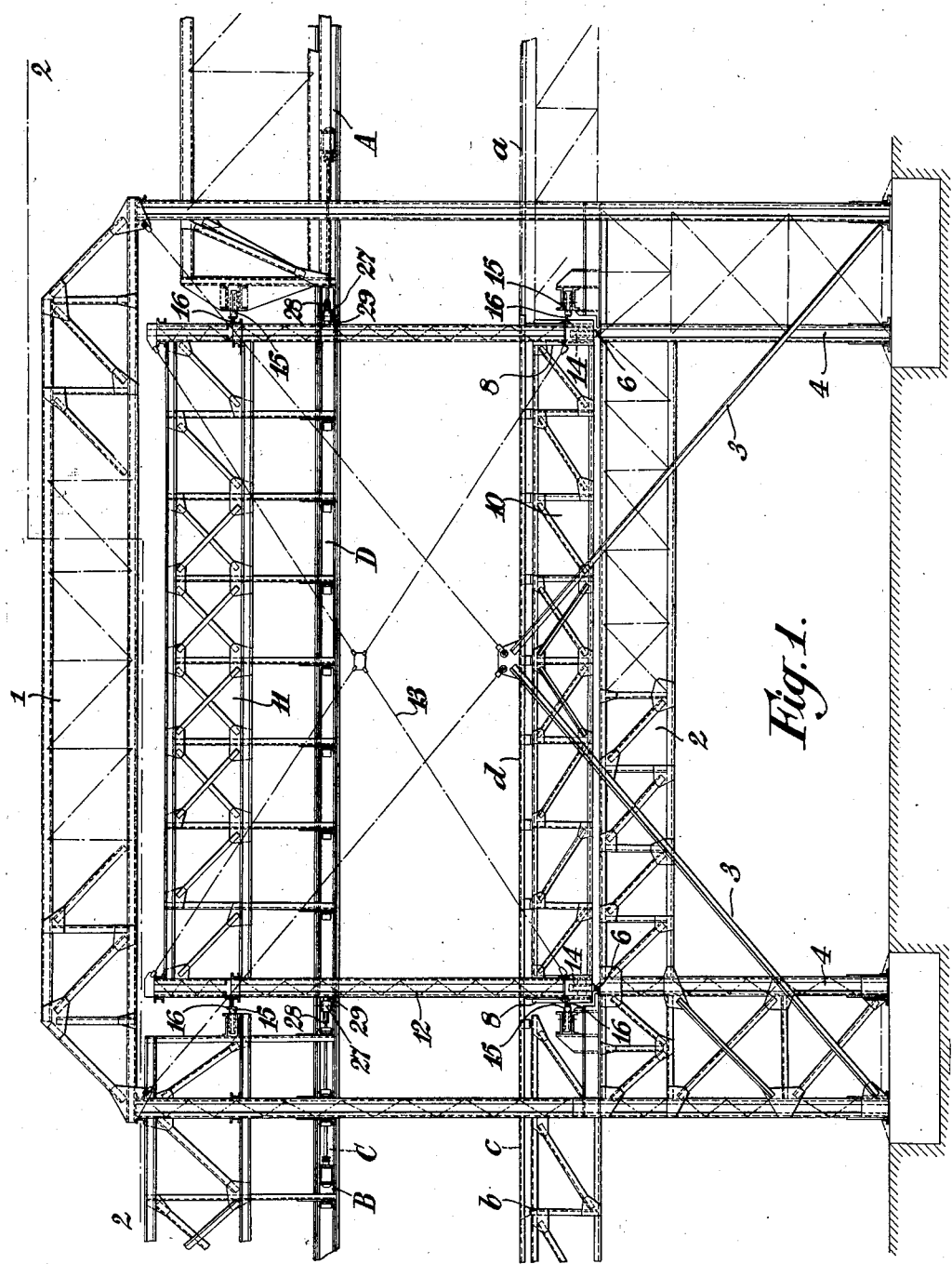
Figure 1 is an elevation of the fixed track and the movable structure.
Figure 2:
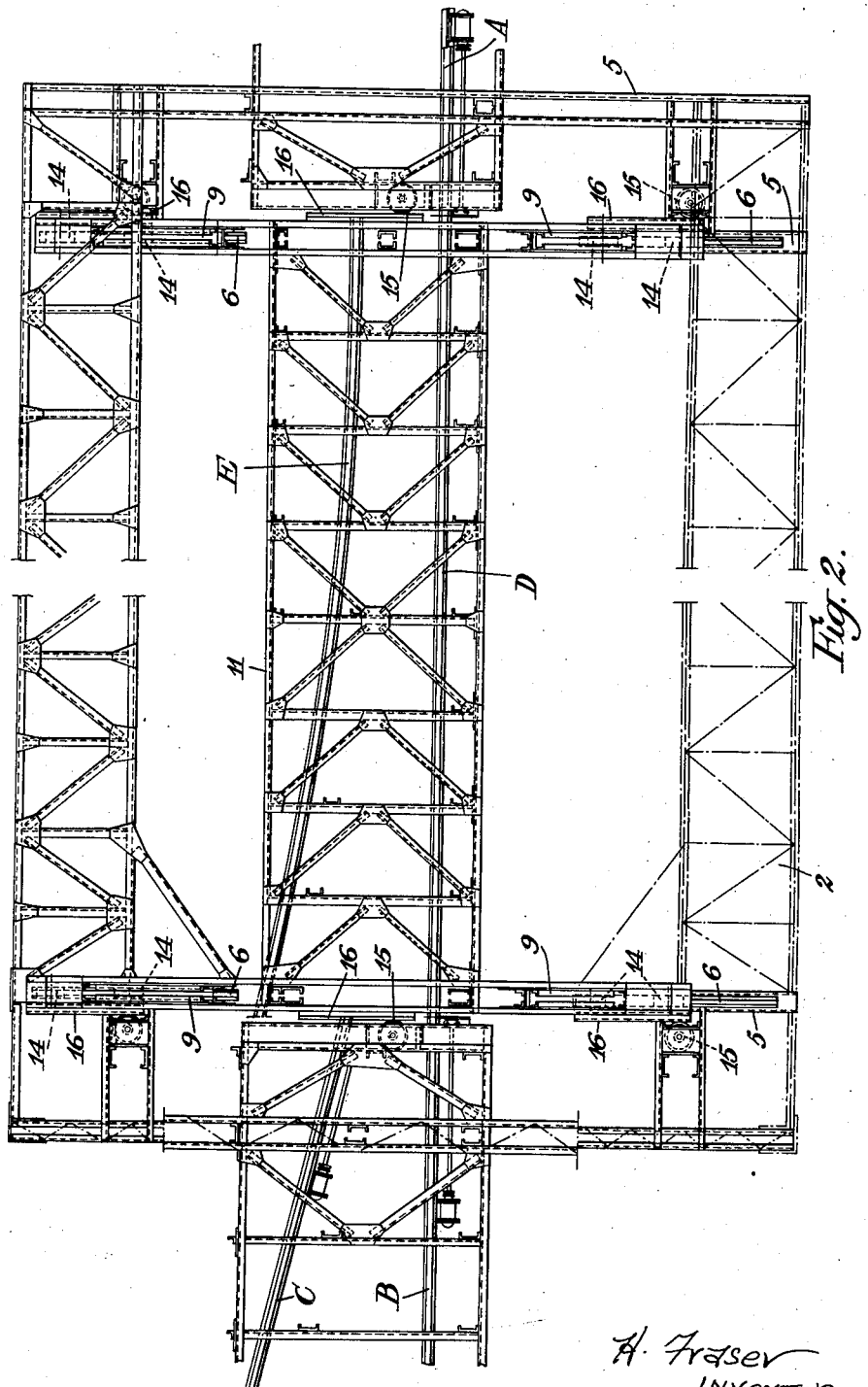
Figure 2 is a plan view on line 2—2 of Figure 1.
Figure 3:
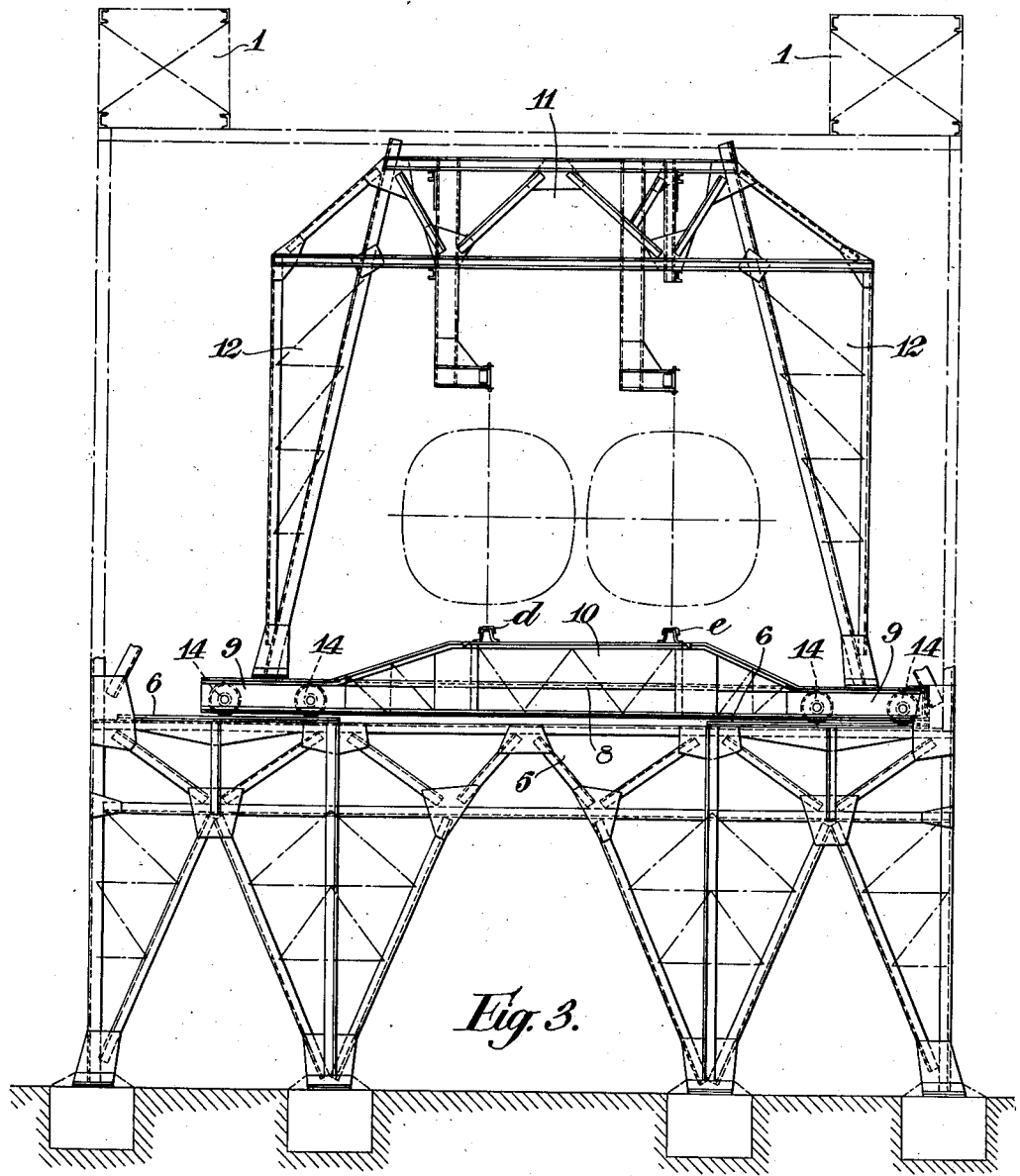
Figure 3 is an end view of Figure 1 with some parts removed.
Figure 8:
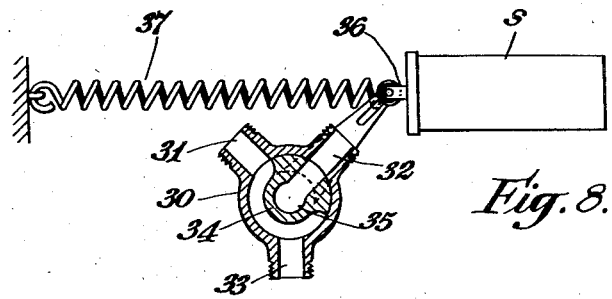
Figure 8 is a detail of the air valve.

The compressed air to the cylinder 25 is admitted by the valve 30 (Fig. 8), the two outlets 31, 32, of which are connected to the two ends of the cylinder, and the inlet 33 is connected to the compressed air reservoir. The rotatable member 34 has a central passage connected to the atmosphere and is operated by the plunger or core 36 of the solenoids acting against a spring 37.

Four solenoids are employed S¹, S², S³, S⁴, (Fig. 4) for the four fixed tracks A, B, C, F. If only three tracks are employed the electrical connections are shown diagrammatically in Figure 9 where the switches R¹ and R² are operated by the movable structure at each end of its travel and thus operate the solenoids S¹ and S² or S¹ and S³. When four tracks are employed, as arranged in Figure 4, the electrical connections are shown diagrammatically in Figure 10, but when arranged as in Figure 4ᵃ they are as shown in Figure 10ᵃ. The switches R¹ and R² are operated in the two extreme positions of the movable structure while the switch R³ is operated in the mid position. A preselector switch P is provided so that the movable structure can only be locked when in engagement with the preselector track. It will be seen that unless one or other of the switches R¹, R², or R³ is operated the solenoids cannot be energized and the locking members cannot be actuated.

As an alternative to the worm and screw traversing arrangement set forth above, I may use pinions in place of the worms, the pinions engaging spur wheels mounted on a horizontal axis. The adjustable cranks are attached to said spur wheels and the movement transmitted to the movable structure through connecting rods attached to said cranks.

As a further alternative the movable structure could be moved by hydraulic or oil pressure against fixed stops.

Further, the locking member 27 could be operated hydraulically or electro-magnetically, or it may be operated mechanically, for example, by the rotation of a screw rod which operates through a nut, bell crank lever, and link mechanism.

The operation is as follows:—

When the movable structure is in one of its extreme positions the track D carried thereby, both upper and lower, bridges the gap to form a direct connection of the main track A on branch track B at each side of the gap, and therefore cars can be traversed at speed along said track, which is perfectly straight, without stopping. When the movable framework is moved to its other extreme position, if three tracks are employed, the track D, both upper and lower, is moved clear of the ends of the main track, but the other track E, both upper and lower, carried thereby is moved into position to bridge the gap and connect the branch line C with the main line A at one side of the gap. Thus by the movement of the said traversable structure the cars can be run along the main line or switched from the main line on to the side track and vice versa.

By the aforesaid locking means the movable framework is effectively locked when in the desired position.

It is to be understood that the usual locking arrangements and other safety devices may be provided whereby the signals or other devices are set at danger when the track is open and not in register with the framework or the framework cannot be traversed unless the signals are at danger.

What I claim is:—

1. In an overhead railway having a main track and at least one branch track, each track having at least one rail, a switching arrangement located at the junction of the branch track and a main track comprising a movable structure, bogies supporting said structure, rails extending transversely of the tracks and on which said bogies travel, at least two overhead tracks, each formed of at least one rail, carried by said structure, one of which tracks when the structure is in one position registers with the ends of the main track at each side of the structure, and another track carried by the structure which registers with the main track at one side of the structure and the branch track at the other side thereof when the structure is in another position, an electric motor for moving the structure transversely on its rails, means for locking the structure when its tracks register with the ends of the main track, and also when registering with an end of the main track and the end of a branch track, pneumatic means for operating said locking means and electric means controlled by the position of the movable structure to control the operation of said pneumatic means so that only when the tracks are in correct register will the locking means be operated.

2. In an overhead railway having a main track and at least one branch track, each track having at least one rail, a switching arrangement located at the junction of the branch track and a main track comprising a movable structure, bogies supporting said structure, rails extending transversely of the tracks and on which said bogies travel, at least two overhead tracks, each formed of at least one rail, carried by said structure, one of which tracks when the structure is in one position registers with the ends of the main track at each side of the structure, and another track carried by the structure which registers with the main track at one side of the structure and the branch track at the other side thereof when the structure is in another position, an electric motor for moving the structure transversely on its rails, means for locking the structure when its tracks register with the ends of the main track, and also the end of a main track and branch track and means for automatically operating said locking means comprising switches which close when the tracks are in register, solenoids energized by the closing of said switches, air valves operated by said solenoids, air cylinders supplied with compressed air by said valves, pistons within said cylinders, and locking devices operatively connected to said pistons and arranged to bridge the adjacent ends of the tracks.

3. In an overhead railway having a main track and at least one branch track, each track having at least one rail, a switching arrangement located at the junction of the branch track and a main track comprising a movable structure, bogies supporting said structure, rails extending transversely of the tracks and on which said bogies travel, at least two overhead tracks, each formed of at least one rail carried by said structure, one of which tracks when the structure is in one position registers with the ends of the main track at each side of the structure, and another track carried by the structure which registers with the main track at one side of the structure and the branch track at the other side thereof when the structure is in another position, an electric motor for moving the structure transversely on its rails, means for locking the structure when its tracks register with the ends of the main track, and also when registering with an end of a main track and the end of a branch track, said locking means comprising members adapted to engage the webs of adjacent ends of the rails so as to prevent relative movement of the rails in both a horizontal and a vertical plane.

4. In an overhead railway having a main track and at least one branch track, each track having at least one rail, a switching arrangement located at the junction of the branch track and a main track comprising a movable structure, bogies supporting said structure, rails extending transversely of the tracks and on which said bogies travel, at least two overhead tracks, each formed of at least one rail carried by said structure, one of which tracks when the structure is in one position registers with the ends of the main track at each side of the structure, and another track carried by the structure which registers with the main track at one side of the structure and the branch track at the other side thereof when the structure is in another position, an electric motor for moving the structure transversely on its rails, means for locking the structure when its tracks register with the ends of the main track, and also when registering with an end of the main track and branch track, said locking means comprising locking members fitted in slots in the ends of the webs of the rails of the main track and branch track and embracing both sides of the webs of the rails, pneumatic means for moving said members longitudinally of the rails to fit into slots in the ends of the webs and embrace both sides of the webs of the rails constituting the tracks of the movable structure.

HUGH FRASER.